US012636874B2

(12) United States Patent
Hu et al.

(10) Patent No.: US 12,636,874 B2
(45) Date of Patent: May 26, 2026

(54) ADHESIVE SYSTEM

(71) Applicants: DDP SPECIALTY ELECTRONIC MATERIALS US, LLC, Wilmington, DE (US); DUPONT MATERIALS TECHNOLOGY (SHANGHAI) CO., LTD., Shanghai (CN)

(72) Inventors: Yiqing Hu, Shanghai (CN); Sergio Grunder, Freienbach (CH)

(73) Assignees: DDP SPECIALTY ELECTRONIC MATERIALS, LLC, Wilmington, DE (US); DUPONT MATERIALS TECHNOLOGY (SHANGHAI) CO., LTD, Shanghai (CN)

( * ) Notice: Subject to any disclaimer, the term of this patent is extended or adjusted under 35 U.S.C. 154(b) by 65 days.

(21) Appl. No.: 18/694,206

(22) PCT Filed: Nov. 10, 2022

(86) PCT No.: PCT/CN2022/131087

§ 371 (c)(1),
(2) Date: Mar. 21, 2024

(87) PCT Pub. No.: WO2023/083248

PCT Pub. Date: May 19, 2023

(65) Prior Publication Data

US 2024/0391230 A1 Nov. 28, 2024

(30) Foreign Application Priority Data

Nov. 11, 2021 (WO) ................ PCT/CN2021/130008

(51) Int. Cl.
*B32B 43/00* (2006.01)
*B32B 7/12* (2006.01)

(52) U.S. Cl.
CPC .............. *B32B 43/006* (2013.01); *B32B 7/12* (2013.01); *B32B 2309/02* (2013.01); *B32B 2375/00* (2013.01)

(58) Field of Classification Search
CPC ..... B32B 43/006; B32B 7/12; B32B 2309/02; B32B 2375/00
See application file for complete search history.

(56) References Cited

U.S. PATENT DOCUMENTS

| | | | | |
|---|---|---|---|---|
| 5,620,794 | A * | 4/1997 | Burkart | E06B 3/56 52/99 |
| 2005/0039848 | A1 * | 2/2005 | Kirsten | C09J 9/00 252/62.51 R |
| 2010/0224316 | A1 | 9/2010 | Soejima et al. | |
| 2012/0082840 | A1 | 4/2012 | Herr et al. | |

FOREIGN PATENT DOCUMENTS

| | | | |
|---|---|---|---|
| WO | 20101447744 | A2 | 12/2010 |
| WO | 2016025821 | A1 | 2/2016 |
| WO | 2018181240 | A1 | 10/2018 |
| WO | 20210213815 | A1 | 10/2021 |

OTHER PUBLICATIONS

Int'l Search Report and Written Opinion in Int'l Application No. PCT/CN22/131087 issued Dec. 20, 2022.

* cited by examiner

*Primary Examiner* — Marla D McConnell

(57) ABSTRACT

Provided herein is a method for dissembling adhered substrates.

6 Claims, No Drawings

ADHESIVE SYSTEM

CROSS REFERENCE TO RELATED APPLICATIONS

This application is a U.S. national stage filing under 35 U.S.C. § 371 of PCT Application No. PCT/CN22/131087 filed on Nov. 10, 2022, currently pending, which claims the benefit of PCT Application No. PCT/CN21/130008, filed Nov. 11, 2021. PCT Application No. PCT/CN22/131087, and PCT Application No. PCT/CN21/130008 are hereby incorporated by reference in their entireties.

FIELD OF INVENTION

The present invention relates to the field of adhesive systems, in particular adhesive systems for battery modules.

BACKGROUND OF THE INVENTION

Battery cells, for example, for electric vehicles, are usually bonded to the battery module or directly to the battery housing of the battery pack using adhesives. Debonding of the adhesive system in the battery packs is needed for repair or recycling. The bonded cells are difficult to remove from the battery module or battery housing since the adhesive that bonds the cells typically has high adhesive strength and the bonding areas are large.

It is known to attempt to address this by using a solvent mixture to soak the bonded area in order to soften the adhesive system. However, the time needed for soaking usually takes several days or more in order to lower the strength to desired level, and solvents are usually dangerous when in direct contact with the battery cells.

There is a ongoing need for adhesive systems which show good adhesive strength but which can be debonded when desired, in order to permit repair and/or recycling.

SUMMARY OF THE INVENTION

In a first aspect, the invention provides a method for separating an adhesively bonded assembly when desired, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 60 and 110° C., and an adhesive applied between the primer and the two substrates;

the method comprising the steps:

(1) heating the adhesively bonded assembly to a temperature between 6° and 110° C. for a time sufficient to soften the adhesive bond between the two substrates; and (2) disassembling the two substrates.

In a second aspect, the invention provides a method for separating an adhesively bonded assembly when desired, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 6° and 110° C., and an adhesive applied between the primer and the two substrates, wherein the lap shear strength of the cured adhesive bond is greater than 5 MPa at 25° C., when measured according to ASTM D 1002;

the method comprising the steps:

(1) heating the adhesively bonded assembly to a temperature between 6° and 110° C. for a time sufficient to soften the adhesive bond between the two substrates to a lap shear strength of less than or equal to 1.5 MPa, when measured as above; and (2) disassembling the two substrates.

In a third aspect, the invention provides a method for replacing an adhesively bonded substrate, which substrate forms part of an adhesively bonded assembly, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 6° and 110° C., and an adhesive applied between the primer and the two substrates, comprising the steps:

(1) heating the adhesively bonded assembly to a temperature between 6° and 110° C. for a time sufficient to soften the adhesive bond between the two substrates to a lap shear strength of less than or equal to 1.5 MPa, when measured according to ASTM D 1002;

(2) disassembling the two substrates; and (3) reassembling the adhesively bonded assembly using adhesive to adhere a replacement for one or both of the first and second substrates.

In a fourth aspect, the invention provides an adhered assembly comprising:

(1) a first substrate;

(2) a second substrate;

(3) a two-component polyurethane adhesive sandwiched between the first and second substrate;

wherein the surface of the first substrate and/or the second substrate has a primer applied thereto prior to application of the adhesive, the primer comprising a film-forming resin having a softening temperature between 50 and 110° C.

DETAILED DESCRIPTION OF THE INVENTION

The inventors have found that by use of a primer comprising a film-forming resin with a softening temperature between 5° and 110° C., in conjunction with a two-component polyurethane adhesive, adhesive bonds can be created that have a strength of greater than 5 MPa at room temperature (25° C.), and that the adhesive strength is diminished to less than or equal to 1.5 MPa on heating to 60 to 110° C. This allows the reduction of adhesion when desired so that an adhered assembly can be disassembled.

Definitions and Abbreviations

DSC Differential scanning calorimetry

MDI 4,4'-Methylenebis(phenyl isocyanate)

HDI Hexamethylene diisocyanate

IPDI isophorone diisocyanate

PU polyurethane

SEC size exclusion chromatography

RH relative humidity

Equivalent and molecular weights are measured by gel permeation chromatography (GPC) with a Malvern Viscothek GPC max equipment. Tetrahydrofuran (THF) was used as an eluent, PL GEL MIXED D (Agilent, 300*7.5 mm, 5 μm) was used as a column, and MALVERN Viscotek TDA (integrated refractive index viscometer and light scattering) was used as a detector.

Film-Forming Resin

The method of the invention involves the application of a primer to the substrate on which the adhesive will be applied. The primer comprises at least one film-forming resin that has a softening temperature of between 5° and 110° C., more preferably between 6° and 110° C., more particularly preferably between 7° and 110° C. Softening temperature is preferably measured by differential scanning calorimetry (DSC), particularly preferably according to ISO 11357-3:2018(E).

The film-forming resin is not particularly limited, but may be selected from polyolefin resins, epoxy resins, polyester resins and mixtures of these.

Suitable polyolefins are, for example, homo- and co-polymers of $C_2$-$C_8$ olefins.

Preferred polyolefins are those having a molecular weight of from 40,000 to 200,000 Da, particularly preferably from 50,000 to 150,000 Da, more particularly preferably 50,000 to 100,000 Da, even more particularly preferably 5,000 to 10,000 Da.qqq Preferred polyolefins are modified, for example with maleic anhydride.

In a preferred embodiment, the film-forming resin is a homo- or co-polymer of $C_2$-$C_8$ olefins, having a molecular weight of from 40,000 to 200,000 Da, particularly preferably from 50,000 to 150,000 Da, more particularly preferably 50,000 to 100,000 Da.

In another preferred embodiment, the film-forming resin is a homo- or co-polymer of $C_2$-$C_8$ olefins, having a molecular weight of from 40,000 to 200,000 Da, particularly preferably from 50,000 to 150,000 Da, more particularly preferably 50,000 to 100,000 Da, modified with maleic anhydride.

In a particularly preferred embodiment, the film-forming resin is a polypropylene modified with maleic anhydride and having a molecular weight of from 50,000 to 150,000 Da, more preferably 50,000 to 100,000 Da.

Suitable polyesters are those resulting from polymerization of one or more diols with one or more diacids.

Preferred polyesters are based on aliphatic diols and aliphatic diacids.

Preferred polyesters have a molecular weight of between 2,500 and 4,500 Da, more preferably between 3,000 and 4,000 Da, particularly preferably 3,500 Da.

Preferred polyesters have a softening point of from 50 and 110° C., more preferably between 6° and 110° C., more particularly preferably between 7° and 90° C.

In a particularly preferred embodiment, the at least one film-forming resin that has a softening temperature of between 50 and 110° C.

Suitable epoxy resins are those based on bis-phenols, such as bis-phenol A.

Preferred epoxy resins are those having a molecular weight of 800 to 2,000 Da, more preferably 900-1,200 Da.

In a particularly preferred embodiment, the film-forming resin is an epoxy resin based on bis-phenol A, having an epoxy functionality of 2 and a molecular weight of approximately 1,000 Da.

In some embodiments, in particular when the film-forming resin is a polyester, the primer does not comprise a solvent, and may consist essentially of the polyester.

In other embodiment, in particular when the film-forming resin is a homo- or co-polymer of $C_2$-$C_8$ olefins, or an epoxy resin, the film-forming resin is preferably used in the primer at from 5 to 30 wt %, more preferably 15 to 25 wt %, based on the total weight of the primer.

In a particularly preferred embodiment, the film-forming resin is a homo- or co-polymer of $C_2$-$C_8$ olefins, having a molecular weight of from 40,000 to 200,000 Da, particularly preferably from 50,000 to 150,000 Da, modified with maleic anhydride, used at from 5 to 30 wt %, more preferably 15 to 25 wt %, more particularly preferably 20 wt %, based on the total weight of the primer.

In a particularly preferred embodiment, the film-forming resin is an epoxy resin based on bis-phenol A, having an epoxy functionality of 2 and a molecular weight of approximately 1,000 Da, used at from 5 to 30 wt %, more preferably 15 to 25 wt %, more particularly preferably 20 wt %, based on the total weight of the primer.

Solvent

The primer of the invention may or may not comprise a solvent. When the film-forming resin is a polyester, the polyester may be used substantially as is, and applied without a solvent.

When the film-forming resin is a homo- or co-polymer of $C_2$-$C_8$ olefins or an epoxy resin, the primer preferably comprises a solvent. The solvent is nor particularly limited, provided the film-forming resin is soluble in it, and sufficiently volatile that it readily evaporates. Preferably it has a vapor pressure at 20° C. of greater than 500 Pa.

Examples of suitable solvents include water, benzene, alkyl benzenes (e.g. toluene, ethylbenzene), dialkyl benzenes (e.g. xylenes), and Solvesso 150 (predominately of $C_9$-$C_{11}$ aromatic hydrocarbons, predominately $C_{10}$). Xylene is particularly preferred.

The solvent is preferably used in the primer at 50 to 95 wt %, more preferably 60 to 90 wt %, particularly preferably 70 to 85 wt %, based on the total weight of the primer.

In a preferred embodiment, the solvent is xylene, used at 50 to 95 wt %, more preferably 60 to 90 wt %, particularly preferably 70 to 85 wt %, based on the total weight of the primer.

Optional Ingredients in the Primer

The primer may additionally comprise other ingredients, such as adhesion promoters.

Preferred adhesion promoters are polyisocyanates, isocyanates, silanes and mixtures of these.

Preferred silanes are trialkoxy alkyl silanes, more particularly trimethoxy alkyl silanes. In a preferred embodiment, the adhesion promoter is a trialkoxy alkyl silane in which the alkyl group bears an epoxy, amine or mercapto group, particularly preferably an epoxy group. In a particularly preferred embodiment, the adhesion promoter is gamma-glycidoxypropyltrimethoxysilane.

Preferred polyisocyanates are polymeric methylene diphenyl diisocyanate ("MDI"), MDI-based prepolymers made by reacting one or more polyols with MDI, hexamethylene diisocyanate ("HDI") trimer, HDI dimer, HDI-based prepolymers made by reacting one or more polyols with HDI, isophorone diisocyanate ("IPDI"), with methylene diphenyl diisocyanate being particularly preferred.

If used, the adhesion promoter is preferably used at 0.1 to 1.5 wt %, more preferably 0.25 to 1 wt %, based on the total weight of the primer.

In a particularly preferred embodiment, the primer comprises gamma-glycidoxypropyltrimethoxysilane at 0.1 to 1.5 wt %, more preferably 0.25 to 1 wt %, based on the total weight of the primer.

In another preferred embodiment, the primer comprises methylene diphenyl diisocyanate at 0.5 to 2 wt %, more preferably 0.75 to 1.5 wt %, particularly preferably 1 wt %, based on the total weight of the primer.

Particularly Preferred Primer Compositions

Some particularly preferred primers are as follows, with weight percentages being based on the total weigh of the primer:

- 15 to 25 wt % of a polypropylene modified with maleic anhydride and having a molecular weight of from 50,000 to 150,000 Da;
- 70 to 85 wt % xylene;
- 0.25 to 1.5 wt % of a polyisocyanate, in particular methylene diphenyl diisocyanate;
- 0.25 to 1 wt % of a silane, in particular gamma-glycidoxypropyltrimethoxysilane.
- 15 to 25 wt % of a polypropylene modified with maleic anhydride and having a molecular weight of from 50,000 to 150,000 Da;
- 70 to 85 wt % xylene.
- 15 to 25 wt % of an epoxy resin based on bis-phenol A, having an epoxy functionality of 2 and a molecular weight of approximately 1,000 Da;
- 70 to 85 wt % xylene;
- 0.25 to 1.5 wt % of a silane, in particular gamma-glycidoxypropyltrimethoxysilane.
- 100 wt % of a polyester.
- 100 wt % of an aliphatic polyester.
- 100 wt % of an aliphatic polyester having a molecular weight of from 3,000 to 4,000 Da.

Substrates

Suitable substrates include bare aluminum, coated steel or coated aluminum, PET film. For bare aluminum, pretreatment is preferred to remove the oxide layer by sanding, or plasma treatment.

Aluminium is a preferred substrate.

Application of the Primer

The primer can be applied using any method. Preferred methods include brush, spray or spreading.

When the film-forming resin is a polyester, it may be applied as is to the substrate. This is done by heating the polyester to above its melting point and applying it to the surface of the substrate.

After application, the primer is allowed to harden or dry. For primers with water as solvent, evaporation of the solvent may be accelerated by heating and/or applying a current of air and/or applying a vacuum. For primers with organic solvents such as xylene, evaporation is usually fast enough at room temperature, although it may be accelerated by heating and/or applying a current of air and/or applying a vacuum.

The dry film thickness of the primer is preferably less than or equal to 30 microns.

Adhesives

The adhesive for use in the invention is any two-component polyurethane adhesive. This includes adhesives with a polyol component and a polyisocyanate component.

The polyol component comprises a molecule having 2, 3 or more hydroxyl groups. Diols and triols are particularly preferred, as well as mixtures of diols and triols.

The molecule having 2, 3 or more hydroxyl groups preferably has a molecular weight of 200 to 1,000 Da.

Examples of suitable molecules having 2, 3 or more hydroxyl groups include polyetherpolyols, polyester polyols and mixtures of these. Suitable polyetherpolyols include those based on polypropylene oxide, polytetramethylene oxide, and mixtures of these. A particularly preferred polyol is sorbitol polyoxypropylene ether.

In a preferred embodiment the polyol component comprises a sorbitol polyoxypropylene ether, and a polyurethane catalyst, such as a tin catalyst, for example dioctyltin mercaptide.

In another preferred embodiment, the polyol component comprises a propylene glycol polyoxypropylene ether, and a polyurethane catalyst, such as a tin catalyst, for example dioctyltin mercaptide.

The polyisocyanate component comprises a molecule having 2, 3 or more isocyanate groups.

Examples of molecules having 2, 3 or more isocyanate groups include aromatic polyisocyanates, aliphatic polyisocyanates and mixtures of these.

In a preferred embodiment, the molecule having 2, 3 or more isocyanate groups is methylene diphenyl diisocyanate, polymeric MDI, or a mixture of these.

In a preferred embodiment, the polyisocyanate component comprises polymethylene polyphenylene isocyanate.

In another preferred embodiment, the polyisocyanate component comprises polymethylene polyphenylene isocyanate and p-toluenesulfonyl isocyanate.

The polyol component and/or the polyisocyanate component may additionally comprise an adhesion promoter, such as a trialkoxy alkyl silane, for example, trialkoxy alkyl silanes in which the alkyl group comprises an epoxy, amino or mercapto group. Aminosilane are particularly preferred. A preferred adhesion promoter is bis(trimethoxysilylpropyl) amine.

The adhesive preferably has a thermal conductivity of greater than 1 W/mK, more preferably greater than 2 W/mK. This can be achieved by incorporating thermally conductive fillers in the adhesive. Suitable thermally conductive fillers are those that have a coefficient of thermal conductivity that is greater than 5 W/mK, greater than 10 W/m° K, or greater than 15 W/m° K. Examples of thermally conductive fillers include alumina, alumina trihydrate or aluminum trihydroxide, silicon carbide, boron nitride, diamond, and graphite, or mixtures thereof. Particularly preferred are aluminium trihydroxide (ATH), and aluminium oxide, with ATH being the most preferred.

In a preferred embodiment, the adhesive comprises a thermally conductive filler at 50 wt % or greater, 60 wt % or greater or 70 wt % or greater, based on the total weight of the adhesive.

In a particularly preferred embodiment, the adhesive comprises 70 wt % or greater, based on total weight of the adhesive, of aluminium trihydroxide.

Method Steps

The method of the invention comprises the steps of:

(1) heating the adhesively bonded assembly to a temperature between 6° and 110° C. for a time sufficient to soften the adhesive bond between the two substrates; and (2) disassembling the two substrates.

The heating step may be carried out using any heating method, for example an oven, IR, radio-frequency heating (including microwave).

The disassembly step involves separating the adhered substrates by pulling the substrates apart.

The primer and adhesive provide a lap shear strength of greater than or equal to 5 MPa at 25° C., preferably greater than 6 MPa, and in certain preferred embodiments greater than 10 MPa at 25° C., when measured according to ASTM D 1002.

The primer and adhesive provide a lap shear strength of less than or equal to 1.5 MPa at temperatures greater than 60° C., more preferably greater than 80° C., when measured according to ASTM D 1002.

Effect of the Invention

The method of the invention permits the disassembly of adhered substrates when desired, simply by heating the adhered assembly to between 6° and 110° C.

This is particularly useful in applications in which it is desirable to disassemble adhered parts from time to time. An example is in battery applications, in which certain elements are secured in place using adhesives, and which elements, such as battery cells, may require replacement from time to time. Using the method of the invention, elements, such as battery cells, which require replacement can be removed easily, and replacement elements inserted in their place, using the primer and adhesive combination.

Particularly Preferred Embodiments

The following are particularly preferred embodiments of the invention:

1. A method for separating an adhesively bonded assembly when desired, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 6° and 110° C., as measured by DSC, and an adhesive applied between the primer and the two substrates;

the method comprising the steps:

(1) heating the adhesively bonded assembly to a temperature between 6° and 110° C. for a time sufficient to soften the adhesive bond between the two substrates; and (2) disassembling the two substrates.

2. A method for separating an adhesively bonded assembly when desired, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 6° and 110° C., as measured by DSC, and an adhesive applied between the primer and the two substrates, wherein the lap shear strength of the cured adhesive bond is greater than 5 MPa at 25° C., when measured according to ASTM D 1002;

the method comprising the steps:

(1) heating the adhesively bonded assembly to a temperature between 6° and 110° C. for a time sufficient to soften the adhesive bond between the two substrates to a lap shear strength of less than or equal to 1.5 MPa, when measured as above; and (2) disassembling the two substrates.

3. A method for replacing an adhesively bonded substrate, which substrate forms part of an adhesively bonded assembly, wherein the adhesively bonded assembly comprises a first substrate and a second substrate adhesively bonded to each other with a two-component polyurethane adhesive, with a primer applied to the surface of one or both substrates, the primer comprising at least one film-forming resin, wherein the softening temperature of the film-forming resin is between 6° and 110° C., as measured by DSC, and an adhesive applied between the primer and the two substrates, comprising the steps:

(1) heating the adhesively bonded assembly to a temperature between 6° and 110° C. for a time sufficient to soften the adhesive bond between the two substrates to a lap shear strength of less than or equal to 1.5 MPa, when measured according to ASTM D 1002;

(2) disassembling the two substrates; and (3) reassembling the adhesively bonded assembly using adhesive to adhere a replacement for one or both of the first and second substrates.

4. An adhered assembly comprising:

(1) a first substrate;

(2) a second substrate;

(3) a two-component polyurethane adhesive sandwiched between the first and second substrate;

wherein the surface of the first substrate and/or the second substrate has a primer applied thereto prior to application of the adhesive, the primer comprising a film-forming resin having a softening temperature between 50 and 110° C., as measured by DSC.

5. Any one preceding Embodiment, wherein the primer comprises at least one film-forming resin that has a softening temperature of between 6° and 110° C., as measured by DSC.

6. Any one preceding Embodiment, wherein the primer comprises at least one film-forming resin that has a softening temperature of between 7° and 110° C., as measured by DSC.

7. Any one preceding Embodiment, wherein the film-forming resin is selected from polyolefin resins, epoxy resins, polyester resins and mixtures of these.

8. Any one preceding Embodiment, wherein the film-forming resin is selected from homo- and co-polymers of $C_2$-$C_8$ olefins.

9. Any one preceding Embodiment, wherein the film-forming resin is selected from polyolefins having a molecular weight of from 40,000 to 200,000 Da.

10. Any one preceding Embodiment, wherein the film-forming resin is selected from polyolefins having a molecular weight of from 50,000 to 150,000 Da.

11. Any one preceding embodiment, wherein the film-forming resin is a homo- or co-polymer of $C_2$-$C_8$ olefins, having a molecular weight of from 40,000 to 200,000 Da, particularly preferably from 50,000 to 150,000 Da.

12. Any one preceding embodiment, wherein the film-forming resin is a polyolefin modified with maleic anhydride.

13. Any one preceding Embodiment, wherein the film-forming resin is a polypropylene modified with maleic anhydride and having a molecular weight of from 50,000 to 150,000 Da, more preferably 50,000 to 100,000 Da.

14. Any one preceding Embodiment, wherein the film-forming resin is a polyester resulting from polymerization of one or more diols with one or more diacids.

15. Any one preceding Embodiment, wherein the film-forming resin is a polyester based on aliphatic diols and aliphatic diacids.

16. Any one preceding Embodiment, wherein the film-forming resin is a polyester having a molecular weight of between 2,500 and 4,500 Da, more preferably between 3,000 and 4,000 Da.

17. Any one preceding Embodiment, wherein the film-forming resin is an epoxy resin.

18. Any one preceding Embodiment, wherein the film-forming resin is an epoxy resin based on bis-phenols, such as bis-phenol A.

19. Any one preceding Embodiment, wherein the film-forming resin is an epoxy resin having a molecular weight of 800 to 2,000 Da, more preferably 900-1,200 Da.

20. Any one preceding Embodiment, wherein the film-forming resin is an epoxy resin based on bis-phenol A, having an epoxy functionality of 2 and a molecular weight of approximately 1,000 Da.

21. Any one preceding Embodiment, wherein the film-forming resin is used in the primer at from 5 to 30 wt %, more preferably 15 to 25 wt %, based on the total weight of the primer.

22. Any one preceding Embodiment, wherein the film-forming resin is a homo- or co-polymer of $C_2$-$C_8$ olefins, having a molecular weight of from 40,000 to 200,000 Da, particularly preferably from 50,000 to 150,000 Da, modified with maleic anhydride, used at from 5 to 30 wt %, more preferably 15 to 25 wt %, more particularly preferably 20 wt %, based on the total weight of the primer.

23. Any one of Embodiments 1 to 21, wherein the film-forming resin is an epoxy resin based on bis-phenol A, having an epoxy functionality of 2 and a molecular weight of approximately 1,000 Da, used at from 5 to 30 wt %, more preferably 15 to 25 wt %, more particularly preferably 20 wt %, based on the total weight of the primer.

24. Any one preceding Embodiment, wherein the primer comprises a solvent in which the film-forming resin is soluble, and having a vapor pressure at 20° C. of greater than 500 Pa.

25. Any one preceding Embodiment, wherein the primer comprises a solvent selected from water, benzene, alkyl benzenes (e.g. toluene, ethylbenzene), dialkyl benzenes (e.g. xylenes), Solvesso 150.

26. Any one preceding Embodiment, wherein the primer comprises a solvent which is xylene.

27. Any one preceding Embodiment, wherein the primer comprises a solvent at 50 to 95 wt %, more preferably 60 to 90 wt %, particularly preferably 70 to 85 wt %, based on the total weight of the primer.

28. Any one preceding Embodiment, wherein the primer comprises a solvent which is xylene, used at 50 to 95 wt %, more preferably 60 to 90 wt %, particularly preferably 70 to 85 wt %, based on the total weight of the primer.

29. Any one preceding Embodiment, wherein the primer comprises: 15 to 25 wt % of a polypropylene modified with maleic anhydride and having a molecular weight of from 50,000 to 150,000 Da;

70 to 85 wt % xylene;

0.25 to 1.5 wt % of a polyisocyanate, in particular methylene diphenyl diisocyanate; and 0.25 to 1 wt % of a silane, in particular gamma-glycidoxypropyltrimethoxysilane.

30. Any one preceding Embodiment, wherein the primer comprises: 15 to 25 wt % of a polypropylene modified with maleic anhydride and having a molecular weight of from 50,000 to 150,000 Da; and 70 to 85 wt % xylene.

31. Any one preceding Embodiment, wherein the primer comprises:

15 to 25 wt % of an epoxy resin based on bis-phenol A, having an epoxy functionality of 2 and a molecular weight of approximately 1,000 Da;

70 to 85 wt % xylene;

0.25 to 1.5 wt % of a silane, in particular gamma-glycidoxypropyltrimethoxysilane.

32. Any one preceding Embodiment, wherein the softening temperature of the film-forming resin is greater than 70° C.

33. Any one preceding Embodiment, wherein the softening temperature of the film-forming resin is greater than 80° C.

34. Any one preceding Embodiment, wherein the heating step is carried out by heating to greater than or equal to 70° C.

35. Any one preceding Embodiment, wherein the heating step is carried out by heating to greater than or equal to 80° C.

36. Any one preceding embodiment, wherein the adhesively bonded assembly is a battery assembly.

EXAMPLES

TABLE 1

| Ingredients | | |
|---|---|---|
| Trademark or abbreviation | Chemistry | Function |
| CP243-1 | Polypropylene modified with maleic anhydride having a molecular weight of from 50,000-100,000 Da, having a softening point between 70-100° C. | Film-forming resin |
| CP730-1 | Chlorine-modified polypropylene having a molecular weight of from 50,000-100,000 Da, having a softening point between 70-100° C. | Film-forming resin |
| GT-7071 | Epoxy resin based on bis-phenol A, having an epoxy functionality of 2, a molecular weight of approximately 1,000 Da and a softening temperature between 70-90° C. | Film-forming resin |
| DYNACOL 7381 | A solid, highly crystalline, saturated polyester, having molecular weight of 3,500 Da, a hydroxyl number of from 27-34 mg KOH/g, an acid number of less than or equal to 2 mg KOH/g, and softening temperature of 73° C. | |
| Xylene | Xylene | Solvent |
| Wannate MD-50 | Methylene diphenyl diisocyanate | diisocyanate |
| Silquest A187 | Gamma-glycidoxypropyltrimethoxysilane | Adhesion promoter |

TABLE 1-continued

| Ingredients | | |
|---|---|---|
| Trademark or abbreviation | Chemistry | Function |
| DYNASILANE 9116 | Hexadecyltrimethoxysilane | Adhesion promoter |
| DER 732P | An epoxy resin that is a reaction product of epichlorohydrin and polypropylene glycol | Epoxy resin |
| DER 330 | An epoxy resin that is a diglycidylether of bisphenol A | Epoxy resin |
| JEFFAMINE T-3000 | Polyetheramine which is a triamine of approximately 3,000 Da molecular weight: 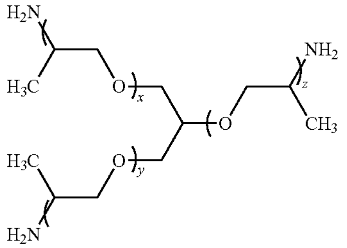 (x + y + z) = 50 | Polyamine |
| Calofort SV | Precipitated calcium carbonate | Antisettling agent |
| RADIA 7956 | Methyl ester of unsaturated $C_{16-18}$ fatty acid | |
| DISFLAMOL TOF | Tris(2-ethyhexyl)phosphate | |
| Ancamine K54 | tris-2,4,6-dimethylaminomethyl phenol | |
| Fomrez UL38 | dioctyl tin dineodecanoate | catalyst |
| DABCO LV33 | 33 wt % 1,4-diazabicyclo[2.2.2]octane in dipropylene glycol | catalyst |
| Blocked polyurethane prepolymer | the reaction product of 77.85 wt % Desmodur E15 and 22.1 wt % Cardolite NX-2026. Reaction procedure: Cardolite NX-2026 and Desmodur E15 are heated in a reactor to 60° C. The catalyst is then added. The reaction mixture is stirred for 45 min at 80° C. under an atmosphere of nitrogen and then for 10 min under vacuum. The colourless reaction product is then cooled to RT and transferred into a container. | |
| Isobloc C11 | low viscosity blocked toluene diisocyanate (TDI) prepolymer | |

Inventive primers 1, 2 and 3 were made by mixing the ingredients listed in Table 2. Primer 4 was DYNACOL 7381, used as supplied.

TABLE 2

| Ingredients of Primers 1, 2, 3 and 4, in wt % | | | | |
|---|---|---|---|---|
| | Primer 1 | Primer 2 | Primer 3 | Primer 4 |
| CP 343-1 | 20 | — | — | — |
| CP 730-1 | — | 20 | — | — |
| GT 7071 | — | — | 20 | — |
| Xylene | 78.5 | 80 | 79.5 | — |
| Wannate MD-50 | 1 | — | — | — |
| Silquest A187 | 0.5 | — | 0.5 | — |
| DYNACOL 7381 | — | — | — | 100 |

Primers 1, 2 and 3 were applied to e-coated aluminium 3003 using a wool brush, and allowed to dry at 23° C. 50% RH for 10 minutes. The resulting film was less than 30 microns.

Primer 4 was heated to 80° C. and then applied in its molten form on aluminium 6061 to form a thin film (<30 microns) and allowed to cool to room temperature.

The following two-component polyurethane adhesives were applied overtop of the dried/cooled primers:

Adhesive 1: A two-component polyurethane adhesive with a polyol component comprising a sorbitol polyoxypropylene ether, 1,4-butane diol and a tin polyurethane catalyst, and an isocyanate component comprising polymethylene polyphenylene isocyanate, polyoxypropylene ether diol, and bis(trimethoxysilylpropyl)amine Adhesive 2: A two-component polyurethane adhesive with a polyol component comprising propylene glycol polyoxypropylene ether, and a tin polyurethane catalyst, and an isocyanate component comprising polymethylene polyphenylene isocyanate, p-toluenesulfonyl isocyanate, propylene glycol polyoxypropylene ether, and bis(trimethoxysilylpropyl)amine Adhesives 3 and 4: The ingredients of Adhesives 3 and 4 are shown in Table 3.

TABLE 3

| Ingredients in Adhesives 3 and 4 | | |
|---|---|---|
| Version. | Adhesive 3 | Adhesive 4 |
| Formulation A - Component | A041 | A058 |
| Isobloc C11 (w %) | 14.75 | 14.75 |
| DER 330 (w %) | 6 | 6 |
| Epoxysilane (w %) | 0.5 | 0.5 |
| ATH bimodal (w %) | 72.5 | 71.65 |
| Precipitated calcium carbonate (w %) | 2 | 2 |
| RADIA 7956 | 1.5 | 1.5 |
| Tris(2-ethylhexyl)phosphate (w %) | 1.5 | 1.5 |
| Green color paste (w %) | 0.1 | 0.1 |
| Hexadecyltrimethoxysilane (w %) | 1.0 | 1.0 |
| Polyester polyol (Capa 2201) (w %) | 0.15 | — |
| Dynacol 7381 | — | 1.0 |

TABLE 3-continued

| Ingredients in Adhesives 3 and 4 | | |
|---|---|---|
| Version. | Adhesive 3 | Adhesive 4 |
| Formulation B - Component | B031 | B031 |
| Trifunctional polyamine, 3000 MW (w %) | 13.17 | 13.17 |
| Trifunctional polyamine, 400 MW (w %) | — | — |
| Radia 7956 (w %) | — | — |
| Tris(2-ethylhexyl)phosphate (w %) | 1.5 | 1.5 |
| Hexadecyltrimethoxysilane (w %) | 1.0 | 1.0 |
| ATH bimodal (w %) | 81.68 | 81.68 |
| Precipitated calcium carbonate (w %) | 2 | 2 |
| tris-2,4,6-dimethylaminomethyl phenol (w %) | 0.4 | 0.4 |
| DABCO LV33 (w %) | 0.1 | 0.1 |
| Polyester polyol (Capa 2201) (w %) | 0.15 | 0.15 |
| RESULTS (A & B Component 1:1 v/v) | | |
| Thermal Conductivity $\lambda_{eff}$ (W/mK) | 1.7 | 1.6 |
| Lap Shear Strength (MPa) | 2.5 | 2.0 |
| Lap shear tests - failure mode on aluminum | 100% CF | 20% CF<br>80% AF |

Adhesives 1 and 2 were cured at 23° C. 50% RH for 10 minutes. Adhesives 3 and 4 were cured and rested for 7 days at 23° C., 50% relative humidity.

Lap shear tests: aluminium (6061 alloy) substrates (140×25 mm, 1.2 mm thick) were used. The substrates were cleaned with isopropanol before use. The thermal interface material was applied to the primer surface of one of the substrates, before joining the second substrate within 5 minutes. The thickness was adjusted to 1.0 mm, the overlap area was 25 mm×25 mm. Adhesives 1 and 2 were cured at 23° C., 50% relative humidity for 10 minutes. Adhesives 3 and 4 were cured and rested for 7 days at 23° C., 50% relative humidity before the lap shear tests were performed. The lap shear samples were then mounted in a tensiometer and the lap shear tests were performed using a pull speed of 10 mm/min. The force deflection curve was monitored and the strength at break is reported as lap shear strength. The results are listed in Table 4.

TABLE 4

Lap shear strengths for different primers of the invention on aluminium/aluminium substrates

| | Primer | | | | | | |
|---|---|---|---|---|---|---|---|
| | Primer 1 | Primer 2 | Primer 3 | Primer 1 | No Primer | No Primer | Primer 4 |
| | Adhesive 1 | Adhesive 1 | Adhesive 1 | Adhesive 2 | Adhesive 3 | Adhesive 4 | Adhesive 3 |
| Lap shear strength at 25° C. (MPa) | 14.5 | 14.8 | 16.1 | 7.6 | 2.5 | 2.0 | 1.7 |
| Lap shear strength at 60° C. (MPa) | 3.3 | 4.2 | 5.1 | 1.9 | 2.4 | 2.1 | 0.8 |
| Lap shear strength at 80° C. (MPa) | 0.6 | 1.1 | 0.8 | 0.27 | 2.3 | 2.0 | 0 |
| Lap shear strength at −40° C. (MPa) | 13 | — | — | — | — | — | — |
| Lap shear strength after heat and humidity ageing (85° C., 85% RH) for 1000 hours (MPa) | 14.5 | — | — | — | — | — | — |

The primers all show good adhesive performance at 25° C. Adhesive strength is reduced by more than 92% for all samples when heated to 80° C.

The invention claimed is:

1. An adhered assembly comprising:
(1) a first substrate;
(2) a second substrate;
(3) a two-component polyurethane adhesive sandwiched between the first and second substrate;
wherein a surface of at least one of the first substrate and the second substrate has a primer applied thereto prior to application of the adhesive, the primer comprising a film-forming resin having a softening temperature between 5° and 110° C.;
and wherein the film-forming resin is a polyolefin modified with maleic anhydride.

2. The assembly of claim 1 wherein the film-forming resin is a polypropylene modified with maleic anhydride and having a molecular weight of from 50,000 to 150,000 Da.

3. The assembly of claim 1 wherein the primer further comprises a solvent selected from water, benzene, alkyl benzenes, dialkyl benzenes and $C_9$-$C_{11}$ aromatic hydrocarbons.

4. The assembly of claim 1 wherein the primer comprises:
15 to 25 wt % of a polypropylene modified with maleic anhydride and having a molecular weight of from 50,000 to 150,000 Da;
70 to 85 wt % xylene;
0.25 to 1.5 wt % of methylene diphenyl diisocyanate; and
0.25 to 1 wt % of gamma-glycidoxypropyltrimethoxysilane.

5. An adhered assembly comprising:
(1) a first substrate;
(2) a second substrate;
(3) a two-component polyurethane adhesive sandwiched between the first and second substrate;
wherein a surface of at least one of the first substrate and the second substrate has a primer applied thereto prior to application of the adhesive, the primer comprising a film-forming resin having a softening temperature between 5° and 110° C., and wherein the film-forming resin is an epoxy resin based on bis-phenols.

6. The assembly of claim 5 wherein the film-forming resin is an epoxy resin based on bis-phenol A, having an epoxy functionality of 2 and a molecular weight of approximately 1,000 Da, used at from 5 to 30 wt %, based on the total weight of the primer.

* * * * *